United States Patent [19]
Leiber et al.

[11] Patent Number: 4,657,046
[45] Date of Patent: Apr. 14, 1987

[54] BRAKE VALVE

[75] Inventors: Heinz Leiber, Oberriexingen; Robert Mergenthaler, Markgröningen, both of Fed. Rep. of Germany

[73] Assignee: Robert Bosch GmbH, Stuttgart, Fed. Rep. of Germany

[21] Appl. No.: 818,445

[22] Filed: Jan. 13, 1986

[30] Foreign Application Priority Data

Mar. 20, 1985 [DE] Fed. Rep. of Germany ....... 3509980

[51] Int. Cl.$^4$ .................. F16K 11/14; B60T 15/06
[52] U.S. Cl. ................................. 137/627.5; 303/54
[58] Field of Search ............... 137/116.5, 627.5, 596; 303/54

[56] References Cited
U.S. PATENT DOCUMENTS 2,698,205 12/1954 Gagen ................................ 303/54
4,090,533 5/1978 Harries ........................... 137/627.5
4,463,561 8/1984 Leiber ............................. 60/547.1

Primary Examiner—Robert G. Nilson
Attorney, Agent, or Firm—Edwin E. Greigg

[57] ABSTRACT

A brake valve for feeding selectably different levels of fluid pressure into at least one pressure receiver, which is a component of a vehicle brake system. The brake valve includes a first, normally open valve having a ball and a second valve, which is normally closed by a closing spring and which likewise has a ball. The latter ball is pressed by pressure provided by a pressure supply apparatus against a ball seat. A compensation piston acted upon by this pressure is also provided, which presses against the ball in the opening direction of the second valve. Because of the compensation piston, the second valve is easily opened, so that brake pressure can be sensitively controlled.

21 Claims, 2 Drawing Figures

BRAKE VALVE

BACKGROUND OF THE INVENTION

The invention is based on a brake valve as generally defined herein. A brake valve connected to a pressure supply apparatus and a return flow container and used for feeding brake pressures into a brake system is known from U.S. Pat. No. 4,463,561. As its valve elements, this brake valve has two balls and two ball seats. The first ball is secured to a control rod and is normally spaced apart from its ball seat; the second ball is moved toward its ball seat by a closing spring, and when it is seated it is additionally pressed against the ball seat by the pressure of the pressure supply apparatus. To feed brake pressure into the brake system, the first ball is pressed against its ball seat, and the second ball is raised from its ball seat by means of a tappet, counter to the force of the spring and counter to the pressure of the pressure supply apparatus. A brake valve of this type is reliably tight, so that during pauses in brake valve operation the pressure supply system does not need to perform any pumping work to compensate for leakage. However, because of the diameter of the ball seat, through which increases in brake pressure are effected, the forces required for raising the ball from its ball seat are disadvantageously great. The magnitude of these forces fluctuates in accordance with the level of pressure furnished by the pressure supply apparatus. A further disadvantage is that to prevent leakage of pressure medium along the displaceable control rod, two seals are required, which must be capable of withstanding the maximum possible pressure provided by the pressure supply apparatus and accordingly are a source of frictional resistance. This frictional resistance is also a hindrance to fine control of brake pressures.

OBJECT AND SUMMARY OF THE INVENTION

The brake valve according to the invention has the advantage that only small actuation forces are required for feeding brake pressures into the at least one pressure receiver. As a result, finer controlled feeding of the brake pressure is possible. The brake valve according to the invention has the further advantage that a error in alignment between the longitudinal axis of the cylinder receiving the compensation piston and the axis of the associated valve seat does not affect tightness. The brake valve can therefore be manufactured economically.

Manufacture of the system is economical which bring about advantages that only one opening element needs to be oriented toward the movable valve element, the latter being embodied as a ball, for example. This facilitates assembly and reduces the engineering expense. One embodiment has the advantage that when the tappet is displaced, very little sliding friction occurs along the shoulder of the tappet.

This invention insures that the second valve will not be openable until the first valve has closed. As a result, an unintended escape of pressure medium to the return flow container during the onset of braking is avoided. This has the advantage that the entire capacity of the pressure supply apparatus is available for rapidly building up brake pressures.

Leakage between the control rod and the housing bore can occur only during braking, so that the advantage of the finer controllablility more than compensates for an additional amount of pumping energy that may be required, although this additional amount is slight. The finer controllability of the valve increases considerably driving safety, particularly on icy roads. The invention also has the advantage that a return stroke length that the control rod must travel between the closure of the second valve and the opening of the first valve is adjustable, which enables more convenient operation.

The invention also has the advantage that brake pressure reductions can be controlled still more finely than is possible with a seat valve, and that nevertheless the advantage of the seat valve, which is the avoidance of leakage, is still fully retained when the brake pressure is being raised or maintained. A control rod for the first seat valve, which is present in any case, also serves as a component of the slide valve and short displacement paths of the control slide are adequate for control purposes.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
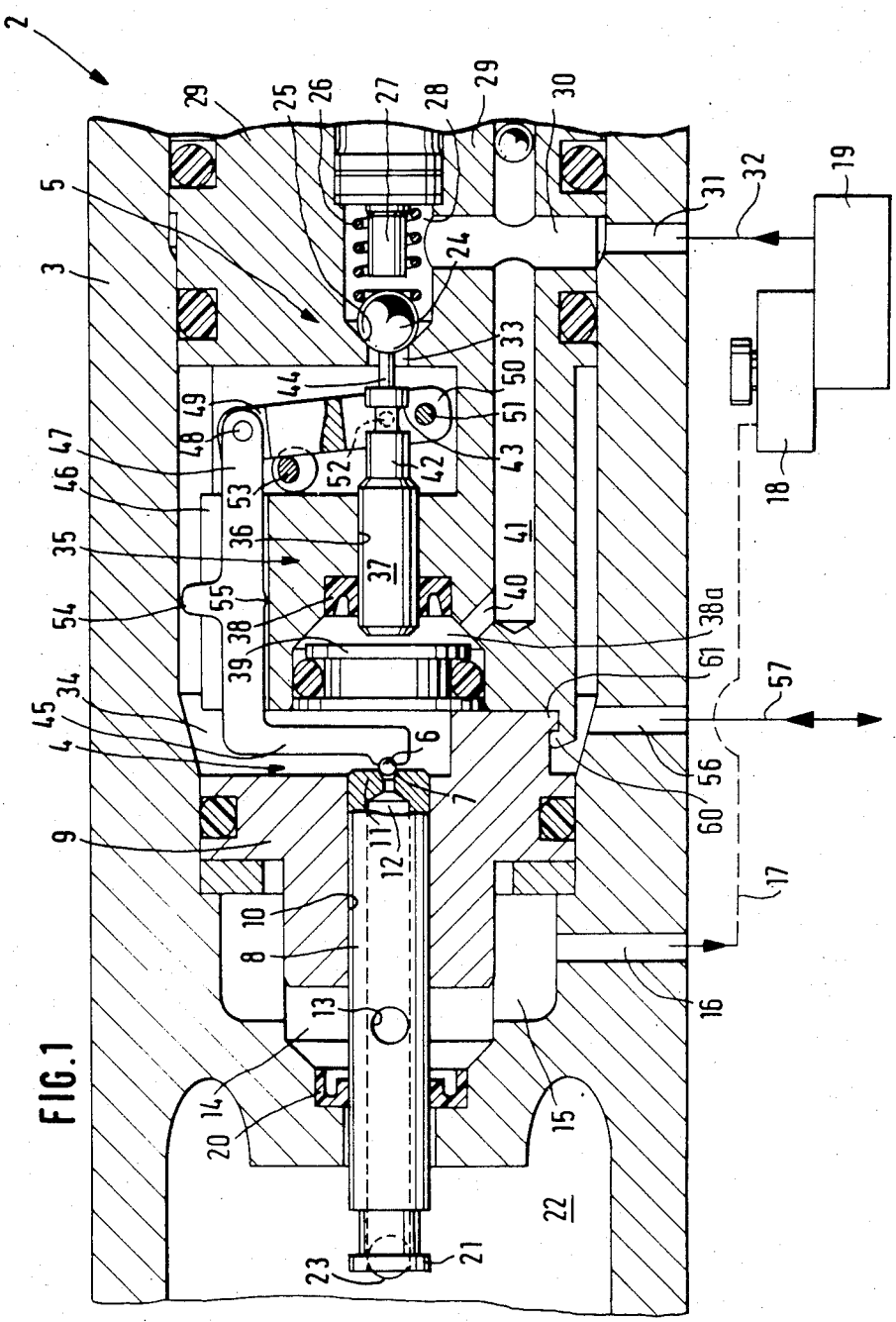
FIG. 1 is a longitudinal section through the first exemplary embodiment of a brake valve according to the invention.

The brake valve 2 shown in FIG. 1 has a housing 3, in which a first valve 4 and a second valve 5 are disposed.

The first valve 4 is embodied as a ball seat valve and has a ball 6, a ball seat 7, a control rod 8 and a housing insert 9. The housing insert 9 is sealingly arranged in the housing 3 and has a guide bore 10. The guide bore 10 surrounds the control rod 8 with such slight play that although the control rod 8 is longitudinally displaceable, still virtually no pressure medium can escape between this control rod and the guide bore 10. The ball seat 7 is located at one end 11 of the control rod 8. Beginning at the ball seat 7, a relief conduit 12 extends inside the control rod 8. A relief bore 13 begins at the relief conduit 12 and discharges radially outside the housing insert 9 into a relief chamber 14 between the housing and one end of housing insert 9. The relief chamber 14 is machined into the housing 3, bordering on the housing insert 9, and communicates via a groove-like recess 15 with a connection bore 16 in the housing wall. From the connection bore 16, a return line 17 leads to a return flow container 18. A pressure supply apparatus 19 which draws pressure medium from the return flow container 18 is located below this return flow container 18. Facing the housing insert 9, the relief chamber 14 is defined by a sealing sleeve 20. The control rod 8 extends through this sealing sleeve, so that with a second end 21 the control rod is located in a housing chamber 22 in which for example a travel simulator, not shown, is housed, engaging the end 21. A ball-shaped closing body 23, by way of example, is pressed into the end 21 and closes off the relief conduit 12 toward the housing chamber 22.

The second valve 5 also has a ball 24 and a ball seat 25 in a second housing insert 29 and furthermore has a closing spring 26 and inside it a tang-like stop 27, which points toward the ball 24. The ball seat 25 and the stop 27 are located in axial alignment with the control rod 8, inside a valve chamber 28, which is located in the housing insert 29 that is accommodated inside the housing 3. A supply conduit 30 in the second housing insert 29 extends from the valve chamber 28 to a connection bore 31 in the housing 3 connected to a supply apparatus 19 oriented toward the suppply conduit 30. A supply line 32 is connected to bore 31 to supply fluid under pressure to the valve chamber 28. In a central orientation relative to the ball seat 25, the second housing insert 29 has an axial bore 33, which is adjoined in the direction of the housing insert 9 by a valve chamber 34 associated with the valve 4. Between the valves 4 and 5, the housing insert 29 is embodied further as a cylinder 35 having an axially extending cylinder bore 36. The cylinder bore 36 is oriented coaxially with the valves 4 and 5 and it receives a compensation piston 37 in a longitudinally displaceable manner. A sleeve seal 38 seals off the compensation piston 37 in the bore 36 of the cylinder 35. Adjacent to the valve 4, the cylinder 35 has a large cylindrical end in which is found a closure element 39. The chamber 38a formed between this closure element 39 and the sleeve seal 38 in the cylinder 35 communicates via two adjoining conduits 40 and 41 with the supply conduit 30 via radial passages 30 and 31. In order toward the valve 5, the compensation piston 37 has formed on it, a stem 42, a shoulder 43 and a tappet-like opening element 44. The tappet 44 protrudes into the bore 33 in the second housing insert and is oriented toward the ball 24.

The ball 6 of the first valve 4 is secured on an L-shaped link 45. This link 45 is substantially bent at a right angle and is guided around one end of the cylinder 35 through a recess 46, which is located in the housing insert 29 juxtaposed cylinder 35. Remote from the ball 6, the link 45 has an end 47, which is articulatedly connected by means of a bolt 48 to one free end 49 of a fork-like lever 50. The lever 50 has a pivot shaft 51, which is located a predetermined distance below (as viewed from the bolt 48) an extension of the longitudinal axis of the compensation. piston 37. In alignment with this extension of the longitudinal axis of the compensation piston 37, the lever 50 has at least one control tang 52, which presses against the shoulder 43 of the compensation piston when the lever 50 is pivoted. An adjustable stop 53 is built into the housing 3. This stop 53 comprises an eccentric element which protrudes between the lever 50 and the adjacent end of cylinder 35. Alignment protrusions 54 and 55 are formed onto the link 45. These protrusions point toward the housing 3 and the cylinder 35 respectively and serve to align the link 45 such that the ball 6 is located substantially in an extension of the longitudinal axis of the ball seat 7 and can be centered by the ball seat 7. A connection bore 56 begins at the valve chamber 34 and extends through the housing 3. The connection bore 56 communicates for example via a line 57 with a booster cylinder, not shown, of a master cylinder and/or with a brake circuit of a vehicle brake system. The first and second housing inserts are secured together by oppositely extending shoulders 60 and 61.

MODE OF OPERATION OF THE FIRST EXEMPLARY EMBODIMENT

Before the pressure supply apparatus 19 is put into operation, the control rod 8 is normally aligned such that the ball seat 7 disposed on it is spaced apart from the ball 6. The ball 24, because of the load put on it by the closing spring 26, is seated on its ball seat 25. As a result, the pressure receiver, such as a master cylinder and/or brake circuit, is relieved of pressure in favor of the return flow container 18 via the line 57, the valve chamber 34, the ball seat 7, the relief conduit 12, the relief bore 13, the relief chamber 14, the groove 15, the passage 16 and the return line 17. When the pressure supply apparatus 19 is put into operation, it generates pressure in the valve chamber 28 of the valve 5, by means of pressure medium withdrawn from the return flow container 18. The pressure prevailing in the valve chamber 28 also flows into the chamber 38a as well, where it acts upon the compensation piston 37. This action urges the compensation piston 37 toward the ball 24, as a result of which the opening tappet 44 connected with this ball comes to rest upon the ball 24, facing the closing spring 26, and acts counter to the action upon this ball, as well as counter to the closing spring 26, in a pre-selectable manner.

As already mentioned, the end 21 of the control rod 8 is connected with a travel simulator, not shown, which in turn is coupled with a brake pedal or the like in a known manner which will therefore not be described herein. To initiate braking, the control rod 8 is displaced toward the valve 4 by means of the brake pedal, via the travel simulator. The ball seat 7 then meets the ball 6, and accordingly the first valve 4 is closed. Thus the pressure relief of the pressure receiver in favor of the return flow container 18 is closed. As the control rod 8 continues to move, it pivots the lever 50 via the ball 6 and the link 45. As a result, the control tang 52 comes into pressure contact with the shoulder 43 of piston 37, so that with continued displacement of the control rod 8, the ball 24 is finally forced away from its ball seat 25. When the second valve 5 opens, the compensation piston 37, because of the pressure exerted upon it by the pressure supply apparatus 19, follows the movement of the ball 24. A gap accordingly forms between the ball seat 25 and the ball 24, which allows pressure medium to flow out of the valve chamber 28 into the valve chamber 34, where it causes a pressure increase. This pressure increase extends to the pressure receiver or receivers via line 57, and also acts upon the end 11 of the control rod 8 nearer the valve chamber, so that the magnitude of the pressure that has been fed in becomes perceptible, in the form of a force on the control rod which is transmitted to the brake pedal. If this force has grown sufficiently, then a displacement of the control rod 8 in the direction of the travel simulator takes place, causing the control tang 52 to move away from the ball seat 25. As a result, the ball 24 takes its seat on the ball seat 24, so that finally the second valve 5 allows no further pressure rise in the valve chamber 34 of the valve 4.

The diameter of the compensation piston 37 is selected such that preferably it virtually compensates for the forces that press the ball 24 onto the ball seat 25. When the second valve 5 opens, substantially the only force that has to be overcome is that of the closing spring 26. As a result, a small initial force at the brake pedal is sufficient to initiate a pressure increase in the pressure receiver. Forces providing feedback upon the brake pedal are therefore substantially generated by the action of the control rod 8 as noted above, so that a very accurate and fine control of the pressure fed into the pressure receiver is attainable. In addition to the compensation piston 37, the lever 50 also contributes to the fineness of the attainable control, because it represents a force translation gear between the control rod 8 and the opening element or opening tappet 44. To this end, the bolt 48 is spaced farther apart from the pivot shaft 51 of the lever 50 than the control tang 52 is, which is moved by the lever 50. As already noted, this control tang 52 acts against the shoulder 43 and is thereby capable, via the opening element 44, of opening the second valve 5.

As already noted above, the control rod 8 is fitted into the guide bore 10 such that virtually no pressure medium can flow between these two parts. The friction that is unavoidable with sealing rings is thus eliminated, so that the control rod 8 can be displaced easily, like a valve slide. This further reinforces the fine control of brake pressures. The sealing sleeve 20 disposed between the relief chamber 14 and the housing chamber 22 needs to withstand a pressure drop on the order of magnitude of only 1 bar, for example. Depending on how the travel simulator that is to be disposed in the housing chamber 22 is embodied and on how it is sealed off from its brake pedal, the sealing sleeve 20 may even be omitted, which still further increases the sensitivity of brake pressure control.

By means of the adjustable stop 53, the pivoting movement of the lever 50 is limited whenever the control rod 8 of the travel simulator is retracted. As soon as the lever 50 comes to rest on the stop 53, the valve 4 can open, and pressure can escape from the pressure receiver through the valve seat 7 to the return flow container 18, via the pressure relief chamber 14. The adjustment of the stop 53 is selected such that it is convenient to control brake pressure reductions; in other words, brake pressure reductions can also be sensitively controlled, without requiring particular concentration in order to achieve this.

A shorter spacing between the relief bore 13 and the ball seat 7 than that shown in FIG. 1 can also be selected, or else the housing insert 9 can be lengthened toward the end 21 of the control rod 8 such that the relief bore 13 is located completely inside the housing insert 9 whenever the valve 4 is closed. As a result, the relief bore 13 is closed. If, after the valve 4 has closed, the control rod 8 is retracted for opening, then first the valve 4 opens and then the relief bore 13 is moved at least partway out of the housing insert 9. Here the housing insert acts as a control bushing, and at the same time the control rod 8 acts as a control slide, so that in addition to the valve 4 embodied as a ball seat valve, a slide valve connected in series with it and mechanically coupled to it is also available. By means of this slide valve, because of its internal pressure equalization that is present, brake pressure reductions can be much more sensitively controlled than would be possible with the ball seat valve 4 alone. As already noted above, the valve 4 effects reliable sealing during brake pressure increases and brake pressure maintenance, so that there is no leakage through the relief bore 13.

Figure 2:
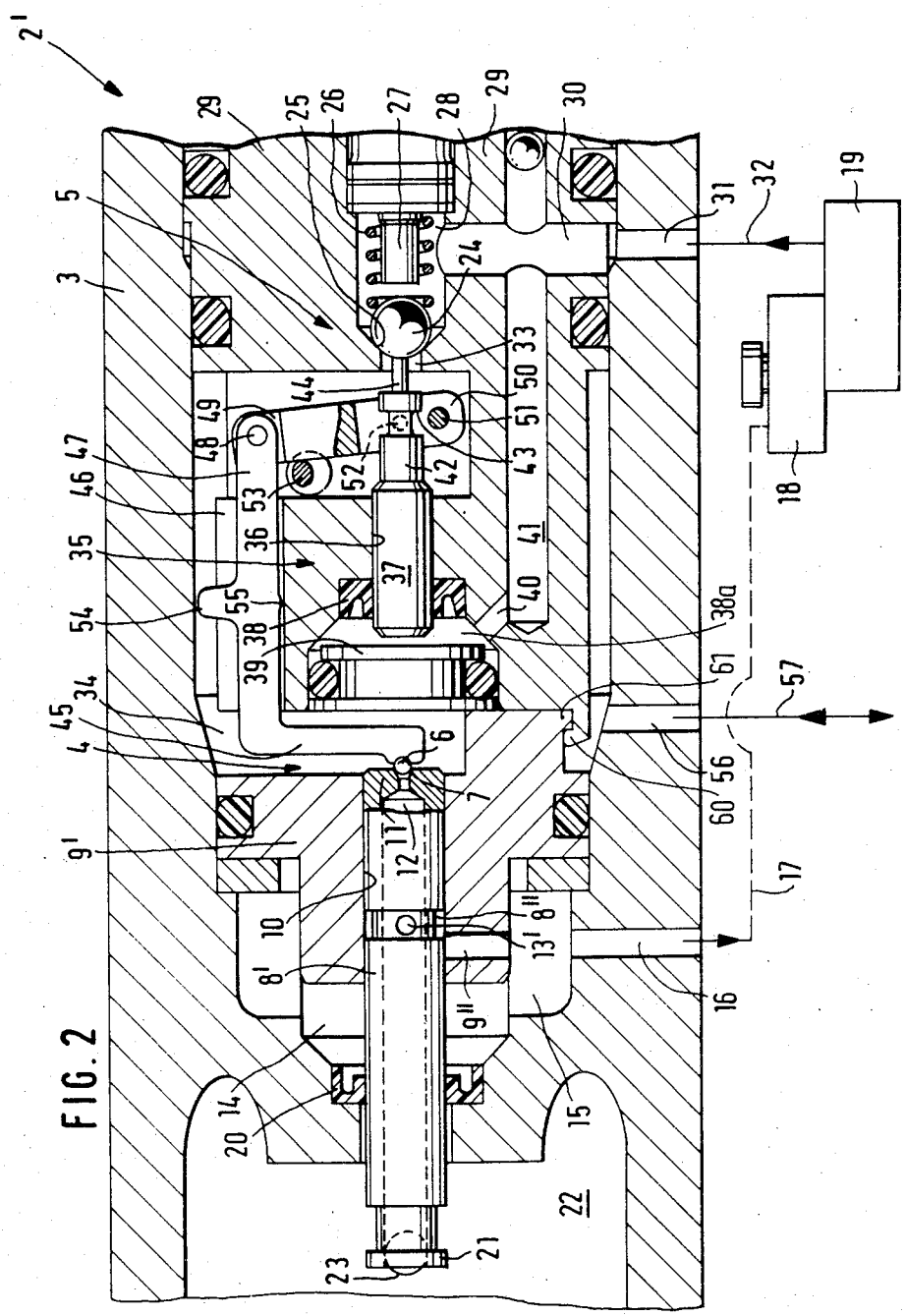
FIG. 2 is a longitudinal section through the second exemplary embodiment.

The brake valve 2' of FIG. 2 differs from the first brake valve 2 in having an altered housing insert 9', which becomes a control bushing by the provision of a substantially transversely oriented control bore 9" is made into a control bushing, and also becomes a control slide cooperating with the stationary control bore 9" by the provision of a control rod 8', which has a control groove 8", embodied for instance as a circumferential groove, and a relief bore 13' beginning at the control groove 8" and leading into the relief conduit 12. The alignments of the control bore 9" and the control groove 8" are also selected such that whenever the valve 4 is closed, the control bore 9" and the control groove 8" will not coincide. Only once the valve 4 has opened does the control groove 8", as the control rod 8' retracts, gradually move away from its normal outset position to coincide with the control bore 9"; as a result, brake pressure reductions can be sensitively controlled in the manner typical of slide valves. As already indicated above, the fact that the control groove 8" can be more accurately aligned than the relief bore 13 of the first exemplary embodiment with respect to the ball seat 7 means that the brake valve 2' can be embodied such that by shortening the actuation paths, more convenient control is attained, especially when brake pressures are being reduced.

It should additionally be noted that a control groove, not shown, which cooperates with the control groove 8" can be machined into the housing insert 9', for example, serving as a control bushing. This would offer the further advantage that the control groove also can be more accurately aligned than the control bore 9" shown in the second exemplary embodiment.

The other reference numerals in FIG. 2 refer to individual elements that are present in the same form in FIG. 1.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A brake valve including a housing for connection to a pressure supply apparatus, a return flow container and at least one pressure receiver for operating vehicle brakes, comprising a first valve which is normally open in a non-braking position and a second valve which is normally closed by means of a closing spring in a non-braking position, said second valve is embodied as a seat valve, a fluid pressure passage which connects said second valve to the pressure supply apparatus, a cylinder in said housing which can be connected to the pressure supply apparatus, a compensation piston in said cylinder, a tappet-like valve opening element which presses against the second valve in the opening direction, and a pivotable lever associated with said compensation piston for opening said second valve to a fluid pressure for operation of the brakes.

2. A brake value as defined by claim 1, which said second valve includes a ball as its movable valve element.

3. A brake valve as defined by claim 1, which said tappet-like opening element is disposed on an end of said compensation piston and that said lever is coupled with said tappet-like opening element.

4. A brake valve as defined by claim 2, which said tappet-like opening element is disposed on an end of said compensation piston and that said lever is coupled with said tappet-like opening element.

5. A brake valve as defined by claim 1, in which said compensation piston includes a shoulder against which said lever can be pressed during opening said second valve.

6. A brake valve as defined by claim 2, in which said compensation piston includes a shoulder against which said lever can be pressed during opening said second valve.

7. A brake valve as defined by claim 5, in which said lever includes at least one control tang disposed between a pivot shaft and a free end of the lever which engages said shoulder on said compensation piston.

8. A brake valve as defined by claim 6, in which said lever includes at least one control tang disposed between a pivot shaft and a free end of the lever which engages said shoulder on said compensation piston.

9. A brake valve as defined by claim 1, in which said first valve includes a ball, said ball is secured to a link which is articulatedly coupled to said lever such that a pressure force oriented toward said ball acts upon said lever and said second valve, a control rod, a ball seat disposed on said control rod and associated with said ball of said first valve and said control rod includes a relief conduit that leads to a relief chamber that can be connected to the return flow container.

10. A brake valve as defined by claim 2, in which said first valve includes a ball, said ball is secured to a link which is articulatedly coupled to said lever such that a pressure force oriented toward said ball acts upon said lever and said second valve, a control rod, a ball seat disposed on said control rod and associated with said ball of said first valve and said control rod includes a relief conduit that leads to a relief chamber that can be connected to the return flow container.

11. A brake valve as defined by claim 3, in which said first valve includes a ball, said ball is secured to a link which is articulatedly coupled to said lever such that a pressure force oriented toward said ball acts upon said lever and said second valve, a control rod, a ball seat disposed on said control rod and associated with said ball of said first valve and said control rod includes a relief conduit that leads to a relief chamber that can be connected to the return flow container.

12. A brake valve as defined by claim 5, in which said first valve includes a ball, said ball is secured to a link which is articulatedly coupled to said lever such that a pressure force oriented toward said ball acts upon said lever and said second valve, a control rod, a ball seat disposed on said control rod and associated with said ball of said first valve and said control rod includes a relief conduit that leads to a relief chamber that can be connected to the return flow container.

13. A brake valve as defined by claim 7, in which said first valve includes a ball, said ball is secured to a link which is articulatedly coupled to said lever such that a pressure force oriented toward said ball acts upon said lever and said second valve, a control rod, a ball seat disposed on said control rod and associated with said ball of said first valve and said control rod includes a relief conduit that leads to a relief chamber that can be connected to the return flow container.

14. A brake valve as defined by claim 9, in which said control rod is oriented in axial alignment with respect to said compensation piston and said link is bent at an angle such that it extends about an end of said cylinder.

15. A brake valve as defined by claim 9, in which said control rod is displaceably supported in a guide bore with narrow gap therebetween.

16. A brake valve as defined by claim 15, in which an adjustable stop protrudes into a valve chamber in which said adjustable stop determines the non-braking position of said lever for an unactuated brake valve.

17. A brake valve for connection to a pressure supply apparatus, a return flow container and at least one pressure receiver such as a vehicle brake system, having a first valve which is normally open in a non-braking position and a second valve which is normally closed by means of a closing spring in a non-braking position, said second valve is embodied as a controllable seat valve and is to be connected to the pressure supply apparatus, said first valve includes a valve seat and a valve element movable against said seat, a slide valve connected in series with said first valve and said first and second valves are embodied and coupled with one another such that upon opening said first and closing said second valve said valve element is raised from its seat first, and said slide valve is subsequently opened.

18. A brake valve as defined by claim 17, in which said slide valve includes a control rod which actuates said first valve.

19. A brake valve as defined by claim 10, in which said valve element is embodied as a ball.

20. A brake valve as defined by claim 18, in which said control rod has at least one transversely oriented relief bore which communicates with said seat of said first valve via a relief conduit extending through said control rod and a housing insert surrounds said control rod and functions as a stationary control bushing.

21. A brake valve as defined by claim 18, in which said control rod includes a control groove on its circumference which communicates with said seat of said first valve via at least one relief bore and a relief conduit which extends axially in the control rod and includes a housing insert which encompasses said control rod and is embodied as a control bushing.

* * * * *